(12) United States Patent
Dillon et al.

(10) Patent No.: US 7,613,618 B2
(45) Date of Patent: Nov. 3, 2009

(54) QUALITY ASSURANCE IN A DELIVERY REPORT

(75) Inventors: Tony Dillon, Wilmette, IL (US); Larry Johnson, Carol Stream, IL (US); Larry Rubin, Chicago, IL (US)

(73) Assignee: Florists' Transworld Delivery, Inc., Downer's, IL (US)

( * ) Notice: Subject to any disclaimer, the term of this patent is extended or adjusted under 35 U.S.C. 154(b) by 210 days.

(21) Appl. No.: 11/544,935

(22) Filed: Oct. 10, 2006

(65) Prior Publication Data

US 2007/0079549 A1   Apr. 12, 2007

Related U.S. Application Data

(60) Provisional application No. 60/724,895, filed on Oct. 11, 2005.

(51) Int. Cl.
*G06Q 10/00* (2006.01)
(52) U.S. Cl. .......................................................... 705/1
(58) Field of Classification Search ........................ None
See application file for complete search history.

(56) References Cited

U.S. PATENT DOCUMENTS

| | | | | | |
|---|---|---|---|---|---|
| 5,440,479 | A | * | 8/1995 | Hutton | 705/26 |
| 5,453,308 | A | * | 9/1995 | Myers | 428/24 |
| 5,971,273 | A | * | 10/1999 | Vallaire | 235/381 |
| 6,587,835 | B1 | * | 7/2003 | Treyz et al. | 705/14 |
| 7,016,865 | B1 | * | 3/2006 | Weber et al. | 705/26 |
| 7,191,942 | B2 | | 3/2007 | Aptekar | |
| 7,213,757 | B2 | * | 5/2007 | Jones et al. | 235/462.01 |
| 7,337,413 | B1 | * | 2/2008 | Reesh et al. | 715/700 |
| 7,422,149 | B2 | | 9/2008 | Aptekar | |
| 2001/0042014 | A1 | * | 11/2001 | Lowry et al. | 705/14 |
| 2002/0082853 | A1 | * | 6/2002 | Goodwin | 705/1 |

(Continued)

FOREIGN PATENT DOCUMENTS

WO    WO 96/41310    12/1996

OTHER PUBLICATIONS

"Philippines—Portal Plans To Boost E-Shopping", Newsbytes News Network, Oct. 6, 2000.*

(Continued)

*Primary Examiner*—John W Hayes
*Assistant Examiner*—Rob Wu
(74) *Attorney, Agent, or Firm*—Millen, White, Zelano & Branigan, P.C.

(57) ABSTRACT

A method includes capturing an image of a flower arrangement at a location of a filling florist and sending a report from the filling florist to a sending florist, the report including the image of the arrangement and an order number. A computer is controlled to capture an image of a flower arrangement at a location of a filling florist, and to send a report from the filling florist to a sending florist. The report includes the image of the arrangement and an order number. A computer readable medium has program modules to control a computer. The computer is controlled to capture an image of a flower arrangement at a location of a filling florist, and to send a report from the filling florist to a sending florist. The report including the image of the arrangement and an order number.

20 Claims, 2 Drawing Sheets

U.S. PATENT DOCUMENTS

| | | |
|---|---|---|
| 2004/0149821 A1 | 8/2004 | Aptekar |
| 2005/0067487 A1* | 3/2005 | Brundage et al. ........... 235/380 |
| 2005/0119944 A1* | 6/2005 | Harasaki et al. .............. 705/26 |
| 2005/0289008 A1 | 12/2005 | Olivier et al. |
| 2006/0095949 A1* | 5/2006 | Whish-Wilson et al. ..... 725/105 |
| 2006/0136236 A1 | 6/2006 | Horton |
| 2007/0079549 A1 | 4/2007 | Dillon et al. |
| 2007/0198375 A1 | 8/2007 | Aptekar |
| 2008/0065499 A1 | 3/2008 | Golub et al. |

OTHER PUBLICATIONS

"FTD.COM Blooms With Fresh Holiday Ideas"—PR Newswire. New York: Dec. 16, 2004. p. 1.*

U.S. Appl. No. 11/470,778, filed Feb. 16, 2007, Golub et al.

* cited by examiner

QUALITY ASSURANCE IN A DELIVERY REPORT

This application claims the benefit of the filing date of U.S. Provisional Application Ser. No. 60/724,895 filed Oct. 11, 2005.

BACKGROUND OF THE INVENTION

The present invention relates to flower delivery networks. In particular, the invention relates to methods and systems for assuring quality in the delivered product.

Flower arrangements are often sold to a customer at the location of a first florist for delivery to a far distant recipient. To meet this need, networks of florist have arisen so that the first florist, called the sending florist, sends an order to a filling florist at a location near the recipient. Flower arrangements are standardized within the network, and the network management distributes instructions for making each standardized flower arrangement along with a photograph of the finished flower arrangement.

With such a network, a customer comes to the sending florist, chooses one of the standard flower arrangements, and pays the sending florist, leaving delivery instructions for delivery to the distant recipient. Often, a personalized message will accompany the delivery of the flower arrangement. The selection number of the chosen flower arrangement, the delivery address, and the personalized message, if any, along with an order number are sent as an order to the filling florist. The order number is associated the sending and filling florists along with their addresses, telephone numbers, etc. The filling florist makes up the flower arrangement, attaches the personalized message, if any, and delivers the flower arrangement the recipient at the address identified in the order. Upon delivery, the filling florist sends a report, including the order number, of the delivery to the sending florist, and the filling florist is paid a portion of the price originally paid to the sending florist by the original customer. In some instances, the sending florist is an Internet web site that takes orders and functions as the sending florist.

Occasionally, a filling florist may run out of a particular flower and make substitutions in the flower arrangement, simply prepare the flower arrangement with less than the prescribed number of flowers, or use old flowers that had begun to wilt. Should a filling florist frequently make flower arrangements with less than the prescribed number of flowers or use old flowers that had begun to wilt, the filling florist would make a windfall profit. The filling florist may feel a financial motivation to vary from the network management's prescribed instructions for making the standardized flower arrangement.

Eventually, recipients talk to customers, and if the flower arrangement varied from the arrangement ordered, the customer may complain to the sending florist with whom the order was placed. Disputes arise between sending and filling florist, and the value of the whole network concept is questioned.

Quality control of the delivered flower arrangement is an important aspect of the management of the network. In some instances, a filling florist have taken photographs with electronic cameras attached the file created by the camera to an E-mail sent back to the sending florist For example, the file created by the camera may be in a JPEG format for attachment to an E-mail.

However, what is needed is a regular means to ensure quality of the delivered flower arrangement to enhance the value of the network concept to all participating florists.

SUMMARY OF THE INVENTION

A method includes capturing an image of a flower arrangement at a location of a filling florist and sending a report from the filling florist to a sending florist, the report including the image of the arrangement and an order number.

A computer is controlled to capture an image of a flower arrangement at a location of a filling florist, and to send a report from the filling florist to a sending florist. The report includes the image of the arrangement and an order number.

A computer readable medium has program modules to control a computer. The computer is controlled to capture an image of a flower arrangement at a location of a filling florist, and to send a report from the filling florist to a sending florist. The report including the image of the arrangement and an order number.

BRIEF DESCRIPTION OF DRAWINGS

The invention will be described in detail in the following description of preferred embodiments with reference to the following figures.

DETAILED DESCRIPTION OF PREFERRED EMBODIMENTS

Figure 1:
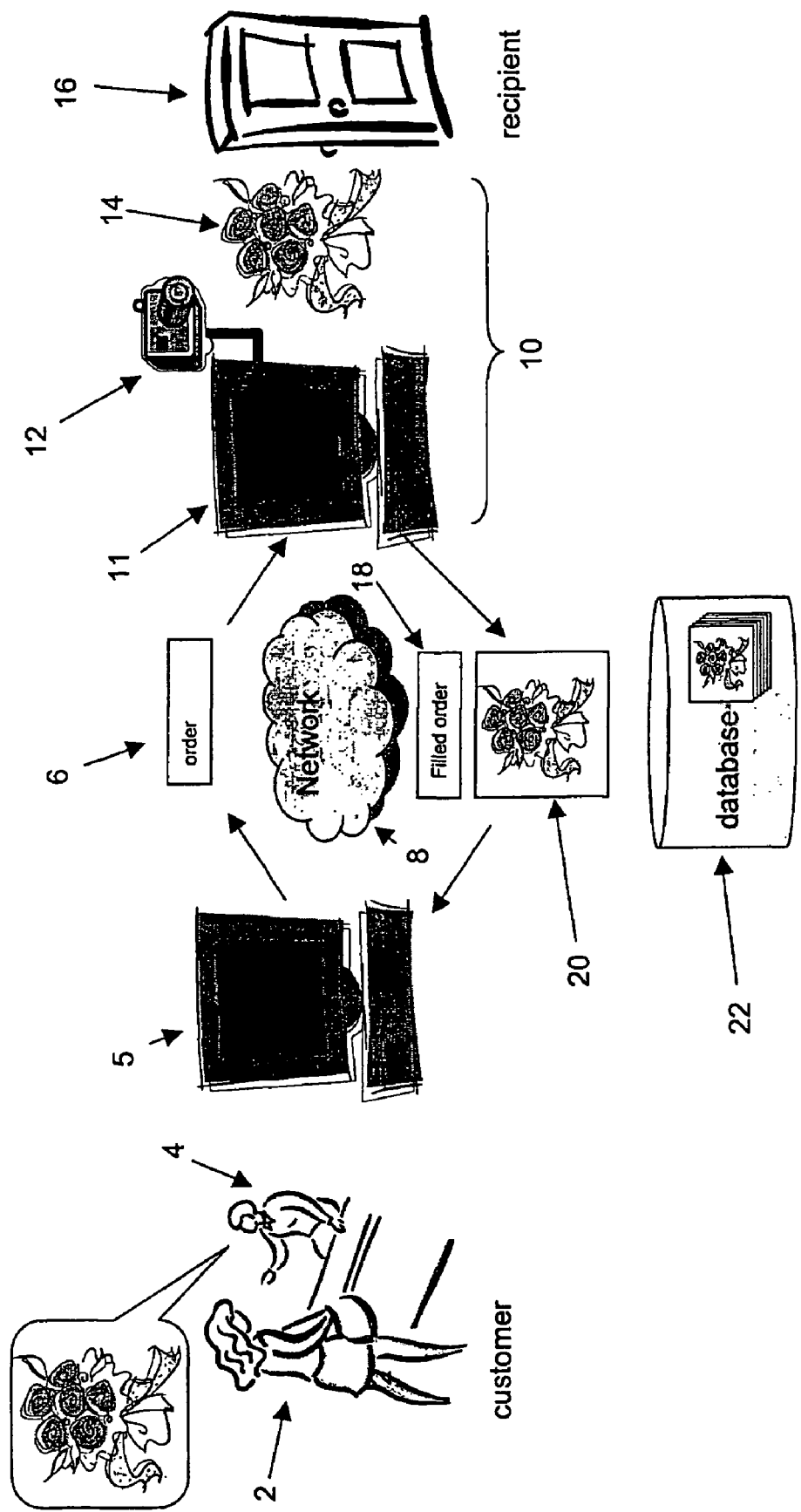
FIG. 1 is a block diagram showing the flow according to an example of the invention of ordering a flower arrangement at a sending florist, sending the order over a network to a filling florist and reporting the delivery of the flower arrangement back to the sending florist.

In FIG. 1, when a filling florist 10 receives an order 6 at his/her computer 11 from a computer 5 of a sending florist 4 over a network 8, the filling florist prepares the ordered flower arrangement 14 according to the order 6 to deliver to a recipient 16.

In a basic embodiment of a method according to the invention, the filling florist captures an image 20 of the arrangement at the location of the filling florist. Then, the filling florist sends a report 18 to the sending florist. The report 18 includes the image 20 of the flower arrangement 14 and the order number.

In a basic embodiment of a computer according to the invention, the computer 11 is controlled, e.g. by a computer program, to capture an image 20 of a flower arrangement at the location of a filling florist. Then, the computer is further controlled to send a report from the filling florist to a sending florist. The report includes the image of the arrangement and an order number. To capture the image of the flower arrangement, the computer may have a digital still camera (DSC) 12 with a link from the DSC to a port in, for example, a desktop computer or an inexpensive web cam connected to a port in the, for example, desktop computer. The computer may be provided already set up by the network management to filling florist, or it may be provided in the form of a computer readable medium, such as a CD ROM or floppy disk to be installed by the computer of the filling florist by the filling florist.

In a basic embodiment of a computer readable medium according to the invention, the computer readable medium has program modules to control a computer to capture an image of a flower arrangement at a location of a filling florist. The program modules further control the computer to send a report from the filling florist to a sending florist. The report includes the image of the arrangement and an order number.

For financial reasons, a filling florist might to be tempted to keep images of his/her previously prepared best flower arrangements on his/her computer and report these images as the delivered standard flower arrangement where the actual delivered flower arrangement may vary. To guard against this possibility, the method, computer and computer readable medium might capture an indicia of the particular flower arrangement and report the indicia with the report.

In an example of the basic embodiment of a method according to the invention, the capturing includes capturing an indicia of the flower arrangement, and the report further includes the indicia.

In an example of the basic embodiment of a computer according to the invention, the computer is further controlled to capture an indicia of the flower arrangement, and the report further includes the indicia.

In an example of the basic embodiment of a computer readable medium according to the invention, the program modules further include a program module to capture an indicia of the flower arrangement. The report further includes the indicia.

A simplest form of the indicia may be nothing more than the date and time stamp of the computer file that carries the image, e.g., the date and time stamp of the JPEG file. A more sophisticated form of the indicia may include the date and time stamp provided by some cameras that is imbedded in the visible image of that is captured by the camera. Yet another form of the indicia might exploit a feature of some cameras that provides the ability to input text to the camera to be used as a label in the captured image. In embodiments of the present invention, the order number might be input to the camera as the text. If a filling florist were tempted to keep the image around for months or years, it would be very difficult for a filling florist to justify to a sending florist why the image send in the report was date stamped before the date of the order, particularly if the image in the report included text indicating a different order. If a filling florist were to deliver two identical standard flower arrangements on the same day, date and time stamps would not assure the sending florist, but the text identifying the particular order would give assurance.

Figure 2:
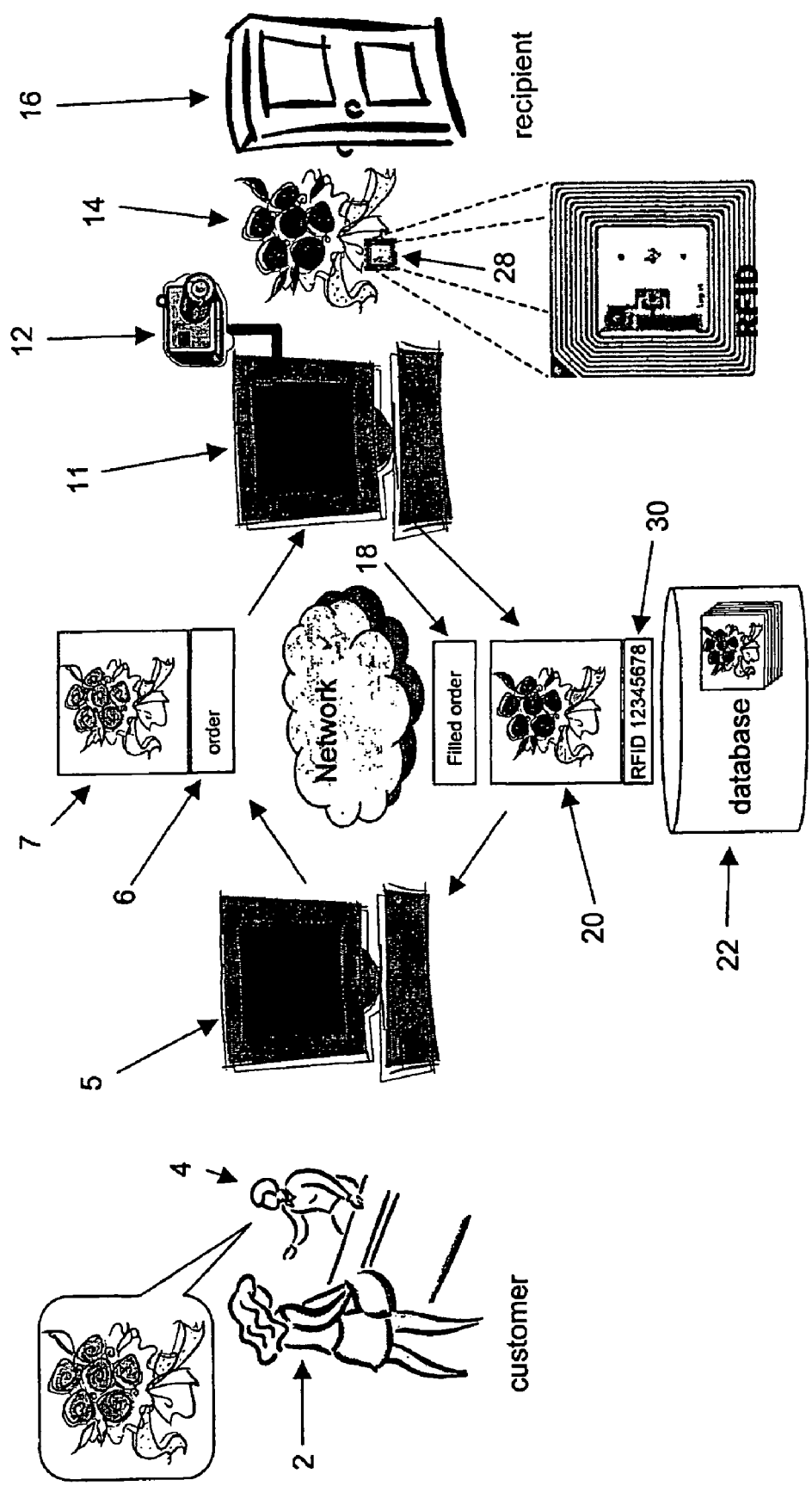
FIG. 2 is a block diagram showing flow as depicted in FIG. 1 in which an RFID code is used as an indicia to be included in the report to the sending florist. Other types of indicia are useable as discussed below.

In a first variant of the example of the basic embodiment of a method according to the invention, the capturing of the indicia includes any one or more of reading an RFID tag 28 (FIG. 2), reading a bar code, reading optical characters, and extracting any one or more of a bar code from the image, optical characters from the image and identifying features of the flower arrangement from the image.

In a first variant of the example of the basic embodiment of a computer according to the invention, the computer further includes means for identifying the indicia. The means for identifying the indicia includes any one or more of an RFID tag reader, a bar code reader, an optical character reader, and a program to extract any one or more of a bar code from the image, optical characters from the image and identifying features of the flower arrangement from the image.

In a first variant of the example of the basic embodiment of a computer readable medium according to the invention, the computer readable medium further includes a program module for any one or more of reading an RFID tag, reading a bar code, reading optical characters, and extracting any one or more of a bar code from the image, extracting optical characters from the image and identifying features of the flower arrangement from the image.

An additional form of the indicia might be bar codes or characters (e.g., alpha-numeric characters or even optically readable characters). For example, when the filling florist receives an order over the network, the filling florist would print the order on a printer, and display the printed order next to the flower arrangement before the image is captured by the camera. The camera resolution and the size of the font used in the order for the order number and date might be sized so that the captured image could be examined to read the order number and date. Alternatively, the camera resolution and the size of a bar code printed on the order might be sized so that the captured image could be examined to read the bar code. A filling florist that routinely fails to capture the flower arrangement image with the printed order, or with the printed order displayed so that its indicia is readable, would be at a disadvantage when trying to prove to a sending florist that he/she had delivered a quality flower arrangement.

In some versions of these embodiments, a computer program may control the computer to examine the image of the flower arrangement with the printed order within the image area and extract any one or more of the order number, the date and time stamps and bar code of the order from the examination of the image. The extracted data could then be placed in the delivery report sent from the filling florist to the sending florist as data in addition to the image.

Alternatively, the computer program to examine the image may alternatively examine features of the flower arrangement itself. For example, the height to width ratio of the flower arrangement might be examined. The number of, and color of, the individual flowers viewable in the image might be examined and extracted. Many measured parameters of the flower arrangement might be extracted and used as indicia of the delivered flower arrangement. This type of extraction software is currently being used in facial recognition software. The extracted data could then be placed in the delivery report sent from the filling florist to the sending florist as data in addition to the image. A filling florist who attempts to reuse the same image of a standard flower arrangement in multiple delivery reports may be detected by the similarity of these many measured parameters since computer programs are very repeatable given the same input data. A filling florist that appears to reuse the same image, based on the extracted data, of a standard flower arrangement in multiple delivery reports would be at a disadvantage when trying to prove to a sending florist that he/she had delivered a quality flower arrangement.

Yet another form of the indicia might be data read by any one or more of a bar code reader, an optical or magnetic character reader and a reader for an RFID (radio frequency identification) tag 30 (F(G. 2). Any one or more of a bar code reader, an optical or magnetic character reader and an RFID tag reader might be used to scan indicia data into the computer.

For example, when the filling florist receives an order over the network, the filling florist might peal a bar code label from a supply of date stamped bar code labels provided by the network manager, and stick the bar code label on the vase of the flower arrangement or the packaging of the flowers. Then, when the image of the flower arrangement is captured, the bar code label is scanned, and both the captured image and the scanned bar code are included in the delivery report sent by filling florist to the sending florist.

Similarly, the filling florist might peal an optical or magnetic character label from a supply of date stamped optical or magnetic character labels provided by the network manager, and stick the optical or magnetic character label on the vase of the flower arrangement or the packaging of the flowers. Then, when the image of the flower arrangement is captured, the optical or magnetic character label is scanned, and both the captured image and the scanned label are included in the delivery report sent by filling florist to the sending florist.

Alternatively, the filling florist might peal an RFID label 28 (FIG. 2) from a supply of date stamped RFID labels provided by the network manager, and stick the RFID label on the vase of the flower arrangement or the packaging of the flowers. Then, when the image of the flower arrangement is captured, the RFID label is scanned, and both the captured image 20 (FIGS. 1 and 2) and the scanned label data 30 (FIG. 2) are included in the delivery report sent by filling florist to the sending florist.

A filling florist that routinely fails to stick the label on the product and scan the label data into the computer, would be at a disadvantage when trying to prove to a sending florist that he/she had delivered a quality flower arrangement. Similarly, if the labels provided by the network manager are associated with a particular data, a filling florist that routinely uses stale labels, would be at a disadvantage when trying to prove to a sending florist that he/she had delivered a quality flower arrangement. Bar code labels and optical character labels might be periodically provided over the network by transmission from the network manager to each participating florist. The florist would simply print the transmitted data onto peal and stick label paper. Ordinarily, RFID labels and magnetic character labels would be prepared by the network manager and periodically mailed to participating florists, although magnetic character labels could be sent electronically, if the florist had a printer with ink capable of printing magnetic characters.

Labels provide by the network manger to a florist by mail or electronically might preferably expire and be replaced periodically.

In a second variant of the example of the basic embodiment of a method according to the invention, the sending of the report includes encoding the indicia in the image sent in the report.

In a second variant of the example of the basic embodiment of a computer according to the invention, the report sent includes the indicia encoded in the image sent in the report.

In a second variant of the example of the basic embodiment of a computer according to the invention, the computer readable medium includes a program module to encode the indicia in the image sent in the report.

The parameter data obtained by extraction from the image or from the scanning of a label might be encoded in the image as if it were a watermark. In fact, known encoding techniques, enable data to be encoded in the image in a way that does not seriously degrade image quality. For example, if data were to be encoded in the image by replacing every $256^{th}$ pixel of the image. If the image is stored in an RGB format with each color represented by 8 bits, then 24 bits of parameter data could be stored in the image every $256^{th}$ pixel. A 3 mega pixel image could store over 280 thousand bits of parameter data.

A copy of the delivery report is sent by the filling florist to the network manager in addition to being sent to the sending florist. The network manager maintains an archive 22 (FIGS. 1 and 2) of the reports. If needed, the network manager accesses the archive for dispute resolution, fraud detection and other quality assurance functions.

Although the invention has been described herein with respect to delivery of flowers and flower arrangements, the invention is equally applicable to delivery of any assembled, or manufactured, products of any sort. The order is taken at one location, and the delivery is affected at another location. For example, gift fruit baskets may be ordered by a customer from a standardized list of gift fruit baskets from a sending agent (such as the sending florist) who sends the order to a filling agent (such as the filling florist) participating in the network who assembles the gift fruit basket from fresh locally available fruit and delivers the gift fruit basket to the recipient. The delivery report would contain an image of the delivered basket. Luxury toiletry gift baskets or food or snack assortments may be similarly distributed.

The described method and system is particularly suited for distribution of products that are perishable or not easily adapted for shipment over long distances. For example, heavy or bulky products may be regarded as not easily adapted for shipment over long distances since the shipping cost might be large. Such products might be assembled or manufactured close to the recipients location.

The described method and system is particularly suited for distribution of products that some or many of the customers might want to see the product or consult the expertise of the sending agent personally before placing the order. For example, a customer may want to see and touch fabrics before sending an order to a custom furniture maker, or a customer may want to consult expertise at a computer store (the sending agent) before ordering a custom configured computer to be delivered to a recipient such as a grandchild far away.

The described method and system is particularly suited for distribution of custom products that will be remotely manufactured in such a way that quality can depend on internal parts, and the internal part once assembled are not viable for inspection without disassembling the product. For example, when a complex machine ordered by a customer, assembled in one country and shipped to another country is received by a recipient, the recipient need not disassemble the machine to inspect it because the delivery report includes photographs of parts needed to be assured of the quality.

Having described preferred embodiments of a novel method and system for sending a delivery report with improved quality assurances (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set forth in the appended claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding U.S. Provisional Application Ser. No. 60/724,895, filed Oct. 11, 2005, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method comprising:
identifying an indicia of a flower arrangement with a computer at a location of a filling florist,
extracting data from the identified indicia of said flower arrangement with a computer at the location of said filling florist,
capturing an image of said flower arrangement with a computer at the location of said filling florist; and
sending a report from a computer at the location of said filling florist to a sending florist, the report including the captured image of said flower arrangement, and data extracted from the identified indicia of said flower arrangement.

2. A method according to claim 1, wherein identifying an indicia of a flower arrangement includes at least one of reading an RFID tag associated with said flower arrangement, reading a bar code associated with said flower arrangement, reading optical characters associated with said flower arrangement, or reading features of the flower arrangement from a captured image of said flower arrangement; and extracting data from the identified indicia of said flower arrangement includes at least one of extracting data read from the RFID tag associated with said flower arrangement, extracting data read from the bar code associated with said flower arrangement, extracting data read from the optical characters associated with said flower arrangement or extracting data read from features of the flower arrangement identified in the captured image of said flower arrangement.

3. A method according to claim 1, wherein the sending of the report includes encoding the data extracted from the identified indicia of said flower arrangement in the image sent in the report.

4. A computer comprising a processor coupled to a memory where the computer is configured to identify an indicia of a flower arrangement at a location of a filling florist, extract data from the identified indicia of said flower arrangement, capture an image of said flower arrangement and to send a report from the filling florist to a sending florist, the report including the captured image of said flower arrangement and data extracted from the identified indicia of said flower arrangement.

5. A computer according to claim 4, wherein:
the computer is further controlled to capture an order number; and
the report further includes the order number.

6. A computer according to claim 5, which identifies the indicia of a flower arrangement at a location of a filling florist by at least one of:
an RFID tag reader;
a bar code reader;
an optical character reader; or
a digital camera; and
extracts data from the identified indicia of said flower arrangement read by said
RFID tag reader;
bar code reader:
optical character reader; or
digital camera; with a program.

7. A computer according to claim 5, wherein the report includes data extracted from the identified indicia of said flower arrangement encoded in the image sent in the report.

8. A computer readable medium having program modules to control a computer to identify an indicia of a flower arrangement at a location of a filling florist, to extract data from the identified indicia of said flower arrangement, to capture an image of said a flower arrangement at a location of a filling florist, and to send a report from the filling florist to a sending florist, the report including the captured image of said flower arrangement and the data extracted from the identified indicia of said flower arrangement.

9. A computer readable medium according to claim 8, further including a program module to capture an order number, the report further including the order number.

10. A computer readable medium according to claim 9, which includes a program module to identify the indicia of a flower arrangement at a location of a filling florist by at least one of:
reading an RFID tag;
reading a bar code;
reading optical characters, or
identifying features of the flower arrangement from said captured image and
extract data from the identified indicia of said flower arrangement read from at least one of said RFID tag, said bar code, said optical characters or said identifying features of the flower arrangement from said captured image.

11. A computer readable medium according to claim 10, wherein the report includes data extracted from the identified indicia of said flower arrangement encoded in the image sent in the report.

12. A method according to claim 1 wherein the data extracted from the identified indicia of said flower arrangement is the order number.

13. A computer as in claim 4 wherein the data extracted from the identified indicia of said flower arrangement is the order number.

14. A computer readable medium according to claim 8 wherein the data extracted from the identified indicia of said flower arrangement is the order number.

15. A method according to claim 2 wherein the identified indicia of said flower arrangement is an RFID tag associated with said flower arrangement.

16. A method according to claim 2 wherein the identified indicia of said flower arrangement comprises a bar code within the captured image of said flower arrangement.

17. A method according to claim 2 wherein the identified indicia of said flower arrangement comprises optical characters within the captured image of said flower arrangement.

18. A method according to claim 2 wherein the identified indicia of said flower arrangement comprises the features of the flower arrangement within the captured image of said flower arrangement.

19. A computer according to claim 6, wherein the identified indicia of said flower arrangement is at least one of
an RFID tag associated with said flower arrangement,
a bar code within the captured image of said flower arrangement,
optical characters within the captured image of said flower arrangement, or
features of the flower arrangement within the captured image of said flower arrangement.

20. A computer readable medium according to claim 10, wherein the identified indicia of said flower arrangement is at least one of
an RFID tag associated with said flower arrangement,
a bar code within the captured image of said flower arrangement,
optical characters within the captured image of said flower arrangement, or
features of the flower arrangement within the captured image of said flower arrangement.

* * * * *

UNITED STATES PATENT AND TRADEMARK OFFICE
CERTIFICATE OF CORRECTION

PATENT NO.       : 7,613,618 B2                                            Page 1 of 1
APPLICATION NO.  : 11/544935
DATED            : November 3, 2009
INVENTOR(S)      : Dillon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this

Nineteenth Day of October, 2010

David J. Kappos
*Director of the United States Patent and Trademark Office*